(12) United States Patent
Kjær et al.

(10) Patent No.: US 11,991,622 B2
(45) Date of Patent: May 21, 2024

(54) BATTERY-POWERED STATIONARY MEASURING DEVICE FOR MEASURING OR DETECTING A VALUE AT A UTILITY INSTALLATION

(71) Applicant: Kamstrup A/S, Skanderborg (DK)

(72) Inventors: Anders Koed Kjær, Skanderborg (DK); Shekib Habbassy, Skanderborg (DK); Jens Hørdum, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 233 days.

(21) Appl. No.: 17/540,032

(22) Filed: Dec. 1, 2021

(65) Prior Publication Data
US 2022/0182924 A1 Jun. 9, 2022

(30) Foreign Application Priority Data
Dec. 4, 2020 (EP) .................................. 20211775

(51) Int. Cl.
*H04W 48/16* (2009.01)
*H04W 52/02* (2009.01)
*H04W 76/18* (2018.01)

(52) U.S. Cl.
CPC ....... *H04W 48/16* (2013.01); *H04W 52/0229* (2013.01); *H04W 76/18* (2018.02)

(58) Field of Classification Search
CPC .. H04W 48/16; H04W 52/0229; H04W 76/18
See application file for complete search history.

(56) References Cited

U.S. PATENT DOCUMENTS

| 2017/0230074 | A1 | 8/2017 | Rose et al. |
| 2022/0200749 | A1* | 6/2022 | Hald ..................... H04L 5/0046 |

* cited by examiner

*Primary Examiner* — Diane D Mizrahi
(74) *Attorney, Agent, or Firm* — McGlew and Tuttle, P.C.

(57) ABSTRACT

A battery-powered stationary measuring device, measuring or detecting a utility installation value, includes a Low Power Wide Area Network (LPWAN) connection module configured to establish a wireless communication connection to a LPWAN for communicating data to a head-end-system (HES) and attempt to successfully establish a connection to the LPWAN by selectively conducting one of the group comprising: an extended LPWAN search and a limited LPWAN search; veto the extended LPWAN search as long as a savings threshold for a total number or amount of power budget savings has not been reached; increase the total of power budget savings for unsuccessful limited LPWAN searches; and allow the extended LPWAN search if the total number or amount of power budget savings has reached the savings threshold. The total number or total amount of power budget savings is reduced with each conducted extended LPWAN search.

15 Claims, 2 Drawing Sheets

BATTERY-POWERED STATIONARY MEASURING DEVICE FOR MEASURING OR DETECTING A VALUE AT A UTILITY INSTALLATION

CROSS REFERENCE TO RELATED APPLICATIONS

This application claims the benefit of priority under 35 U.S.C. § 119 of European Application 20211775.0, filed Dec. 4, 2020, the entire contents of which are incorporated herein by reference.

TECHNICAL FIELD

The present disclosure relates to a battery-powered stationary measuring device for measuring or detecting a value at a utility installation, in particular to a consumption meter for registering a consumption of water, gas and/or thermal energy.

TECHNICAL BACKGROUND

It is known that utility providers of water, gas and/or thermal energy use automatic meter reading (AMR) systems or advanced meter infrastructure (AMI) systems to efficiently and reliably manage customer billing. Such systems may be referred to as "dedicated" meter reading systems. Dedicated meter reading systems are characterized in that consumption meters are installed in a plurality of households, for instance, and communicate consumption data to a head-end-system (HES) via a wireless communication with dedicated data collectors. A single data collector may collect the consumption data read by thousands of consumption meters. Several data collectors may be distributed over a city or region to cover all consumption meters located therein. Typically, the consumption meters communicate with the data collectors wirelessly using license-free frequency bands in a manner that saves as much battery-power of the consumption meters as possible, because there is usually no opportunity for recharging or exchanging the consumption meter battery. It is therefore a constant challenge to be able to guarantee a minimum battery lifetime, for example of at least 10, 15 or preferably even 20 years with hourly or daily readings.

In order to reduce the cost of implementing and maintaining an infrastructure of dedicated data collectors, a public cellular communications network may be used instead of dedicated data collectors to collect the consumption data. For instance, the consumption meters may comprise a connection module, e.g. a modem, to connect to a Low Power Wide Area Network (LPWAN) provided by a public cellular communications network, e.g. a Narrowband Internet-of-Things (NB-IoT) or Longterm Evolution Machine Type Communication (LTE-M) network, e.g. LTE Cat NB1, LTE Cat NB2, LTE Cat M1 or LTE Cat M2. The frequency bands used in such a LPWAN are licensed, but have a large link budget. It is therefore desirable to provide a battery-powered consumption meter that is able to efficiently register consumption data regularly via a LPWAN, e.g. hourly or once per day, over a guaranteed minimum lifetime, e.g. 8 or 10 years.

In contrast to "dedicated" meter reading systems that "own" (includes lease) the data collector infrastructure, a public cellular communications network is part of a "generic" meter reading system, in which the wireless communication infrastructure between the consumption meter and the HES, i.e. the LPWAN, is owned, maintained and controlled by external parties, e.g. mobile network operators (MNO). Using a generic meter reading system, a utility provider (UP) of water, gas and/or thermal energy only owns (or leases), maintains and controls the consumption meters and the HES.

Therefore, as a matter of principle, the LPWAN network is not known to the consumption meter when it is initially installed for the first time. As the LPWAN network is out of control of the utility provider, the LPWAN network may be changed over time, so that a consumption meter may not be able to connect to the LPWAN network it used before.

However, searching for a suitable LPWAN network with a sufficient signal quality can take a very long time, e.g. 15 minutes or longer in some instances if a multitude of frequency bands must be searched. It is a problem that searching a suitable LPWAN network with a sufficient signal quality consumes significant battery-power, but it is not predictable how often a search is required and how long a search will take.

SUMMARY

It is therefore an object of the present disclosure to provide a consumption meter with a guaranteed minimum battery-lifetime for regular consumption meter readings without having any knowledge about how often a long LPWAN search is required and how long such a search will take. This object may not be limited to consumption meters, but may be applicable to any kind of battery-powered stationary measuring device for measuring or detecting a value at a utility installation. For example, this may include consumption meters, alarm sensors, acoustic noise detectors, chemical sensors, turbidity sensors, remotely controlled valves or other kinds of monitoring sensors.

According to a first aspect of the present disclosure, a battery-powered stationary measuring device for measuring or detecting a value at a utility installations is provided, wherein the measuring device comprises an LPWAN connection module configured to establish a wireless communication connection to a Low Power Wide Area Network (LPWAN) for communicating data to a head-end-system (HES) via the LPWAN, wherein the LPWAN connection module is configured to:

attempt to successfully establish a connection to the LPWAN by selectively conducting one of the group comprising: an extended LPWAN search and a limited LPWAN search;

veto the extended LPWAN search as long as a savings threshold for a total number or amount of power budget savings has not been reached;

increase the total number or amount of power budget savings for each unsuccessful limited LPWAN search; and allow the extended LPWAN search if the total number or amount of power budget savings has reached the savings threshold, wherein the total number or total amount of power budget savings is reduced with each conducted extended LPWAN search.

Therefore, the principle idea is that the LPWAN search is limited to save power consumption as long as a certain savings threshold has not been reached. As long as a limited LPWAN search is successful, the power consumption is relatively low. However, if the limited LPWAN search is not successful, the idea is not to conduct an extended LPWAN search right away, but to "save" energy by stopping the attempt to establish an LPWAN connection. So, energy is saved, because the maximum energy consumption of the limited LPWAN search is below the energy consumption of the extended LPWAN search. A LPWAN search is considered to be successful herein if an LPWAN connection could be established, and unsuccessful otherwise. The LPWAN connection module may be powered-down without having sent data until the next regularly scheduled reading is due. So, further energy may be saved by non-sending data, e.g. a certain maximum or typical average energy quota per data transfer based on the schedule is not spent. A minimum battery-lifetime can thereby be guaranteed, because an excessive number of long LPWAN searches is prevented. It should be noted that "powerup"/"powerdown" shall include herein a switching on/off or leaving/entering a Power Saving Mode (PSM), in which the LPWAN connection module cannot be reached through the LPWAN, but stays being registered to it. The term "reduced" shall include herein a reduction to a certain number or amount, or by a certain number or amount, of power budget savings. Preferably, the total number or total amount of power budget savings is reduced, e.g. reset, to an initial number, e.g. zero, or reduced by a certain amount, e.g. an amount equivalent to the power budget spent for the extended LPWAN search in excess of a typical or average limited LPWAN search.

The measuring device may comprise an electronics housing enclosing electronic components, e.g. a microcontroller, in signal-connection to the LPWAN connection module. The LPWAN connection module may be part of the enclosed electronic components and/or at least partly integrated into a microcontroller. For instance, the LPWAN connection module may be arranged together with a microcontroller on a common printed circuit board (PCB) or on a separate PCB. Alternatively, the LPWAN connection module may be arranged in an extra housing of the measuring device, wherein the extra housing may be integrated, attached to or separate from the electronics housing.

Preferably, the LPWAN may be a network using a Narrowband Internet of Things (NB-IoT) or Longterm Evolution Machine Type Communication (LTE-M) technology standard developed by the 3rd Generation Partnership Project (3GPP). Preferably, any of the specifications defined in 3GPP Releases 13, 14, 15, 16 or later may be used. Possible 3GPP IoT technologies may include LTE Cat NB1, LTE Cat NB2, LTE Cat M1 or LTE Cat M2.

As the link budget for the licensed LPWAN connection is relatively high, the data may comprise redundant information of a certain number, e.g. 10, of latest readings, so that "gapless" meter reading is possible even if no data was transferred in some scheduled readings.

If the limited LPWAN searches have been unsuccessful for a certain number of scheduled readings, certain power budget savings have been accumulated. Once these power budget savings reach a savings threshold, the extended LPWAN search is allowed. The savings threshold may be determined based on the guaranteed battery-lifetime, an average energy-saving per non-successful limited LPWAN search, and/or the redundancy/overlap in the data.

Optionally, the total number of power budget savings may be a counter value for counting the number of unsuccessful limited LPWAN searches, wherein the savings threshold may be a predetermined integer value, e.g. 10. This is particularly advantageous if the average energy-saving per non-successful limited LPWAN search can be assumed to be constant.

Optionally, the total amount of power budget savings may be an accumulated value for the sum of power budget savings by unsuccessful limited LPWAN searches, wherein the savings threshold may be a predetermined threshold value. This is particularly advantageous if the average energy-saving per non-successful limited LPWAN search is not constant. The energy consumption of each conducted extended LPWAN search may be determined and stored to update the savings threshold value based on past experience with the energy-consumption for extended LPWAN searches. The energy saved for each skipped transmission of data may also be added to the power budget savings.

Optionally, the LPWAN connection module may be configured to limit the limited LPWAN search to a predetermined maximum search duration and/or prioritized frequencies or frequency bands. As the energy-consumption of the LPWAN search mainly scales with the power-on time of the LPWAN connection module, it is preferred to limit the limited LPWAN search to a predetermined maximum search duration, e.g. to 45 seconds. It should be noted that the limited LPWAN search is preferably stopped before reaching the maximum search duration if a LPWAN connection can be successfully established. It is further preferred to increase the chance of success for a limited LPWAN search by prioritizing certain frequencies or frequency bands. For instance, the LPWAN connection module may use a subscriber identity module (SIM) card of a certain mobile network operator (MNO) who uses specific frequencies or frequency bands that may be prioritized, i.e. searched before other frequencies or frequency bands. The country where the measuring devices are to be used may give further information about the specific frequencies or frequency bands used for the LPWAN provided in that country.

Optionally, the LPWAN connection module may be configured to use LPWAN connection information stored in or transmitted to the measuring device for the limited LPWAN search. This is a very effective way to increase the success rate of the limited LPWAN searches. It could be used in combination with the above-mentioned first aspect of the present disclosure or independently as a separate second aspect of the present disclosure. Preferably, the LPWAN connection information may also be used for the extended LPWAN search.

For instance, each base station of a Public Land Mobile Network (PLMN) may be identified by an E-UTRA Absolute Radio Frequency Channel Number (EARFCN). If the EARFCN of the closest base station(s) to the measuring device installation is known, the limited LPWAN search is very likely successful, because it usually takes only a few seconds to connect to a known base station. As the measuring device is stationary, the EARFCN of the closest base station(s) is not very likely to change. Therefore, it is beneficial to store the EARFCN of the latest successful LPWAN connection for subsequent readings. However, it should be noted that the MNO may change the frequency or frequency band the PLMN uses during the lifetime of the measuring device, so that an EARFCN known to be successful in the past may not guarantee that this EARFCN is successful once and for all. Furthermore, before the first installation of the measuring device, there is no stored EARFCN available based on past experience of that measuring device. As the installing person must ensure a successful first initial LPWAN connection, the person would have to wait for maybe 15 minutes or longer if he/she were to force the LPWAN connection module to conduct an extended LPWAN search for finding a suitable LPWAN network. It is thus advantageous that the installing person uses a mobile device, e.g. a smartphone or tablet, which has stored LPWAN connection information for the network cell it is currently located in. The mobile device may be used to transfer this stored LPWAN connection information, e.g. in form of an EARFCN, to the measuring device before the LPWAN network is searched for the first time. This increases significantly the chance of success of a limited LPWAN search even for the first initial LPWAN connection after installation. Therefore, the installing person may only need to wait for a few seconds instead of 15 minutes to establish a LPWAN connection successfully after first installation. This reduces the time and cost of the installation procedure significantly. The mobile device may have the useful "local" LPWAN connection information, e.g. EARFCN of the nearest base station(s), based on its own connectivity experience. Alternatively, or in addition, the mobile device may "learn" suitable EARFCN from a previous installation of a measuring device close by, i.e. likely to be located in the same network cell. The measuring device may therefore be able to communicate, e.g. wirelessly by WiFi, wMBus, Optical eye, Bluetooth LE or a proprietary ISM protocol, or near field communication, to the mobile device one or more stored suitable EARFCN after a successful LPWAN connection. The mobile device may then pass this EARFCN on to the next measuring device to be installed in the neighbourhood. For instance, the EARFCN may be communicated from the mobile device to the HES along with a postal address or GPS information. Alternatively, the measuring device may send the EARFCN to the HES via the LPWAN. The EARFCN in combination with the relevant address or GPS information may be retrieved by other mobile devices operated by other installers, whereby installation efficiency is improved. The LPWAN connection information may include a set or list of several EARFCN so that the LPWAN connection module can test more than one promising EARFCN.

Optionally, the measuring device may be configured to powerup the LPWAN connection module according to a predetermined data transmission schedule. For instance, the data transmission schedule may be hourly, daily, or any other regular interval scheme depending on the need of the UP for the billing process.

Optionally, the measuring device may be configured to power-down the LPWAN connection module after each unsuccessful limited LPWAN search. This is most effective to save energy and to accumulate power budget savings. A non-active powered LPWAN connection module would consume energy without any need. It is preferably not powered-up before the next reading is due according to the predetermined data transmission schedule. So, an unsuccessful limited LPWAN search means that a due data reading is skipped as long as the extended LPWAN search is vetoed. This drawback can be compensated by a redundant data set that is transmitted with each successful reading. For example, each data set may partly include the information of previous readings in order to prevent an information "gap" in case of skipped readings. The measuring device may comprise a microcontroller for powering-up the LPWAN connection module at predefined regular intervals for communicating the data and for powering-down the LPWAN connection module afterwards for saving battery power. The LPWAN connection module may be at least partly integrated into the microcontroller or a completely separate electronic module.

Optionally, the LPWAN connection module may be configured to conduct a limited LPWAN search if an extended LPWAN search is vetoed. Preferably, the limited LPWAN search and the extended LPWAN search may not differ from each other except for the search time. In other words, if the LPWAN search is stopped when a predetermined maximum search duration is reached or after prioritized frequencies or frequency bands have been searched unsuccessfully, it is a limited LPWAN search. Otherwise, it is an extended LPWAN search. It should be noted that the limited LPWAN search is preferably stopped before reaching the maximum search duration if a LPWAN connection can be successfully established.

Optionally, the extended LPWAN search comprises scanning for longer duration and/or more frequencies or frequency bands than the limited LPWAN search for successfully establishing an LPWAN connection between the measuring device and the LPWAN network. Preferably, the beginning of the extended LPWAN search may be identical to the limited LPWAN search in order to make use of any LPWAN connection information stored in or transmitted to the measuring device. Alternatively, as the limited LPWAN search may have proven to be unsuccessful, the extended LPWAN search may prioritise other frequencies and frequency bands. It should be noted that the extended LPWAN search is preferably stopped as soon as a LPWAN connection can be successfully established. This means that, in some quickly successful events, the extended LPWAN search may have a shorter duration and/or less frequencies or frequency bands searched than the limited LPWAN search.

Optionally, the measuring device may be a consumption meter for registering a consumption of water, gas and/or thermal energy at the utility installation.

Optionally, the LPWAN connection module is configured to send data to the head-end-system (HES) via the LPWAN network after each successfully established LPWAN connection. As successfully establishing a LPWAN connection always costs battery-power, it is efficient to use any established connection for data transmission, e.g. consumption data. Vice versa, it is efficient to only power-up the LPWAN connection module if data is to be transmitted according to a predetermined data transmission schedule and to power it down as soon as data transmission is finished.

Optionally, the LPWAN connection module may be configured to conduct an allowed extended LPWAN search if the latest limited LPWAN search was unsuccessful. Thus, the latest unsuccessful limited LPWAN search may have saved enough power budget so that the total number or amount of power budget passed the savings threshold for allowing an extended LPWAN search which is conducted when the next scheduled reading is due. This means that an extended LPWAN search is conducted if it is allowed at power-up of the LPWAN connection module. As the following examples show, this is not always the case, because an allowed extended LPWAN search does not necessarily have to be conducted. Further conditions may be applied to reduce the number of extended LPWAN searches as much as possible.

Optionally, the LPWAN connection module may be configured to conduct an allowed extended LPWAN search if a success rate of limited LPWAN searches is below a predetermined success rate threshold. So, the total number or amount of power budget savings having passed the savings threshold is a first condition to allow the extended LPWAN search in the first place, and the success rate of limited LPWAN searches being below a predetermined success rate threshold is a second condition to actually conduct the extended LPWAN search. For instance, the predetermined success rate threshold may be set to 50%. The rationale behind this is that there is a good chance that the next limited LPWAN search is successful if the success rate experienced success so far is higher than that. So, in order to avoid an extended LPWAN search as much as possible, it is beneficial to try another limited LPWAN search until the success rate drops below the threshold.

Optionally, the LPWAN connection module may be configured to conduct an allowed extended LPWAN search if a predetermined number of latest limited LPWAN searches was consecutively unsuccessful. Preferably, the predetermined number may be identical to the predetermined integer value, e.g. 10, used as the savings threshold if a counter value is used to count the total number of power budget savings. This would mean that the total number of power budget savings must have been accumulated in consecutive unsuccessful limited LPWAN searches. The rationale here is that a limited LPWAN search should be tried as long as the latest successful limited LPWAN search is not too long ago.

According to an independent second aspect of the present disclosure, in order to speed up the procedure of installing measuring devices at a plurality of distributed utility installations, a battery-powered stationary measuring device for measuring or detecting a value at a utility installation is provided, wherein the measuring device comprises an LPWAN connection module configured to establish a wireless communication connection to a Low Power Wide Area Network (LPWAN) network for communicating data to a head-end-system (HES) via the LPWAN network, wherein the LPWAN connection module is configured to:
  receive LPWAN connection information from a mobile device via near field communication, e.g. NCF, RFID, or another kind of wireless local area network (WLAN), e.g. WiFi, wMBus, Optical eye, Bluetooth LE or a proprietary ISM protocol, and
  establish a connection to the LPWAN network based on the received LPWAN connection information and/or conduct a LPWAN search prioritizing certain frequencies and/or frequency bands according to the received LPWAN connection information.

Optionally, the LPWAN connection module may be further configured to save and/or update the LPWAN connection after successfully establishing a connection to the LPWAN and to send this stored and/or updated LPWAN connection information to the mobile device via said near field communication, e.g. NCF, RFID, or said other kind of wireless local area network (WLAN), e.g. WiFi, wMBus, Optical eye, Bluetooth LE or a proprietary ISM protocol. Thereby, the mobile device can "carry" the latest successful LPWAN connection information from one installed and connected measuring device to the next measuring device to be installed and connected in the neighbourhood, i.e. likely to be located in the same LPWAN cell. In a preferred embodiment, the EARFCN may be communicated from the mobile device to the HES, preferably in combination with a postal address or GPS information. Alternatively, the measuring device may send the EARFCN to the HES via the LPWAN. The EARFCN, preferably in combination with the relevant address or GPS information, may be retrieved by other mobile devices operated by other installers, whereby installation efficiency is improved.

The above-mentioned LPWAN connection information may particularly comprise one or more EARFCN identifying frequency bands used by one or more base stations serving the local cell of the LPWAN. In addition to, or instead of, receiving the LPWAN connection information from a previously installed and connected measuring device, the mobile device may comprise its own LPWAN modem for providing the LPWAN connection information based on its own connectivity experience in the current LPWAN cell.

Embodiments of the present disclosure will now be described by way of example with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
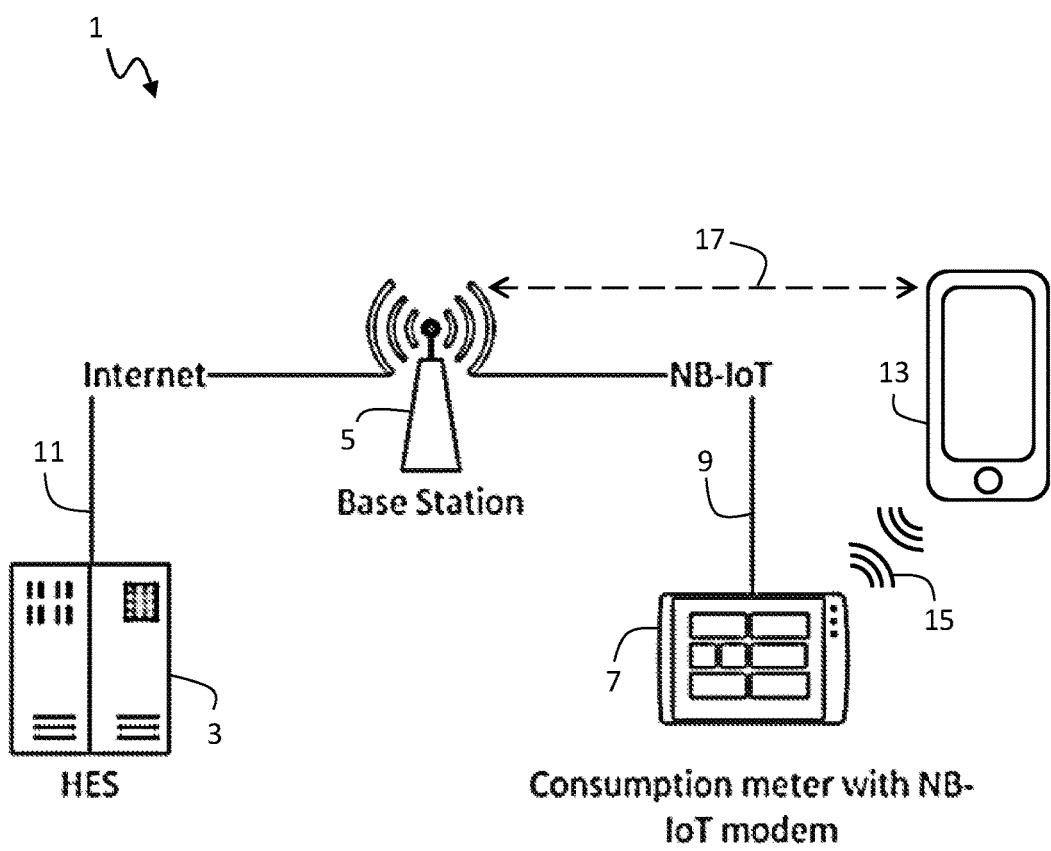
FIG. 1 is a schematic drawing of a meter reading system comprising an example of a measuring device disclosed herein.

Referring to the drawings, FIG. 1 shows schematically a meter reading system 1 comprising a head-end system (HES) 3, a base station 5 of a Low Power Wide Area Network (LPWAN), and a measuring device 7 in form of a consumption meter. The measuring device 7 may be a consumption meter for registering a consumption of water, gas and/or thermal energy at a utility installation, e.g. a private household, a public facility, or an industry facility. The measuring device 7 may alternatively be an alarm sensor, an acoustic noise detector, a chemical sensor, a turbidity sensor, a remotely controlled valve or another kind of monitoring device that is supposed to send regularly information to the HES 3. The HES 3 receives and processes information from and/or controls the behavior of a multitude of measuring devices 7 that are installed in a multitude of utility installations.

The LPWAN is provided by a multitude of distributed base stations 5 of a public cellular mobile communications network. FIG. 1 shows only one of these base stations as the base station 5 the measuring device 7 is currently wirelessly connected with by a connection 9 using a Narrowband Internet of Things (NB-IoT) or LTE-M technology standard, e.g. LTE Cat NB1, LTE Cat NB2, LTE Cat M1 or LTE Cat M2. The HES 3 is connected to the base stations 5 of the LPWAN via an internet connection 11, preferably by wire or glass fiber.

Once the measuring device 7 has successfully established the connection 9 to the base station 5, it is able to transfer consumption data or any other data that it is supposed to send to the HES 3. The communication may be essentially unidirectional from the measuring device 7 to the HES 3, but preferably bi-directional between the measuring device 7 and the HES 3. A bi-directional communication allows the HES 3 not only to receive the data from the measuring device 7, but also to control and update the behavior of the measuring device 7, e.g. to control an integrated valve.

The measuring device 7 may comprise a microcontroller, e.g. a CPU, a MOSFET, a EEPROM, or an FPGA, a permanent or volatile storage medium, e.g. a RAM, a LPWAN connection module, e.g. a modem, a battery, and preferably a human-machine-interface (HMI), e.g. comprising a display, a touchscreen, a button and/or a switch. A sensor module for measuring or detecting a value at a utility installation may be integrated into the measuring device 7 or connected to it by wire or wirelessly. The measuring device 7 may comprise a metering unit and a Meter Transmission Unit (MTU) connected to the metering unit. The value may be indicative of a physical quantity, such as a fluid flow or a heat flow through a pipe the sensor module is mounted on. The measuring device 7 is configured to continuously, regularly, or sporadically store the measured or detected value with or without a time stamp. Alternatively, or in addition, the measuring device 7 may be configured to process, e.g. sum up, the measured or detected value and to store the processed value, e.g. a cumulative value.

The microcontroller of the measuring device 7 is configured to power-up the LPWAN connection module according to a predetermined data transmission schedule, e.g. hourly or daily. The LPWAN connection module may be at least partly integrated into the microcontroller or a completely separate electronic module. In order to save as much battery power as possible, the LPWAN connection module is only powered for as long as it is needed for establishing the LPWAN connection 9 and transmitting data to the connected base station 5. The data may comprise all or parts of the stored measured, detected or processed value with or without a time stamp and identification data for identifying the measuring device 7 or the sensor module, or the utility installation respectively. The data may be encrypted and authenticated using symmetric or asymmetric cryptographic methods and algorithms including message authentication codes.

FIG. 1 shows further a mobile device 13, e.g. s smartphone, tablet or other handheld device, of an operating person who is installing, maintaining, replacing, or inspecting the measuring device 7. The mobile device 13 may be configured to communicate with the measuring device 7 via a near field communication 15, e.g. NFC, RAID, or a wireless local area network (WLAN), e.g. WiFi, wMBus, Optical eye, Bluetooth LE or a proprietary ISM protocol. It may further be equipped to connect to the base station 5 of the LPWAN via wireless connection 17. The wireless connection 17 is optional and may be using a NB-IoT standard or another mobile communications standard.

The mobile device 13 may have stored up-to-date LPWAN connection information, e.g. at least one E-UTRA Absolute Radio Frequency Channel Number (EARFCN) for identifying the frequencies or frequency bands used by one or more of the base stations 5 in the connectivity range, i.e. the LPWAN cell the stationary measuring device 7 is installed or about to be installed. Therefore, the mobile device 13 can be used to speed-up the process of installing, maintaining, replacing, or inspecting the measuring device 7. Before finishing the process of installing, maintaining, replacing, or inspecting the measuring device 7 the operating person will have to make sure that the measuring device 7 has successfully established the LPWAN connection 9 to the base station 5. Without any LPWAN connection information, the LPWAN connection module may search for a suitable LPWAN connection for up to 15 minutes or longer. In order to speed this up, the mobile device 13 may use the near field communication 15 to communicate one or more promising EARFCN that are used by one or more base station 5 in the current LPWAN cell. Having this LPWAN connection information, the LPWAN connection module is likely to find a suitable LPWAN connection within seconds. This makes the process of installing, maintaining, replacing, or inspecting the measuring device 7 much more efficient and quicker. The mobile device 13 may have learned the local LPWAN connection information, e.g. EARFCN, from its own connectivity experience using its wireless connection 17 to the base station 5. Alternatively, or in addition, the mobile device 13 may have learned the local LPWAN connection information, e.g. EARFCN, from another measuring device 7 previously installed in the vicinity, e.g. in the neighbourhood, likely to be located within the same LPWAN cell. So, the near field communication 15 is preferably bidirectional so that the measuring device 7 is able to communicate the local LPWAN connection information, e.g. EARFCN, to the mobile device 13 after it has successfully established the LPWAN connection 9 to the base station 5. The mobile device 13 would not need the wireless connection 17 to the base station 5 in this case.

The measuring devices may be shipped with certain LPWAN connection information stored on it. For instance, the LPWAN connection module may use a subscriber identity module (SIM) card of a certain mobile network operator (MNO) who uses specific frequencies or frequency bands that may be prioritized, i.e. searched before other frequencies or frequency bands. Alternatively, or in addition, the country where the measuring devices 7 are to be used may give further information about the specific frequencies or frequency bands used for the LPWAN provided in that country.

The measuring device 7 preferably stores LPWAN connection information, e.g. EARFCN, that allowed a successful LPWAN connection 9 to the base station 5. As the measuring device 7 is stationary and the LPWAN unlikely to change very often, the stored LPWAN connection information, e.g. EARFCN, is preferably used for any subsequent attempt to establish the LPWAN connection 9 with the base station 5. However, as the base station 5 and the LPWAN as such as are part of a public cellular communication system that is under control of a MNO, i.e. often outside of the control of a utility provider (UP) operating the HES 3 and the measuring devices 7. The LPWAN may thus change in certain aspects during the lifetime of the measuring devices 7. It is, however, important for a UP to guarantee a minimum battery-lifetime of the measuring devices 7, e.g. 8 or 10 years. Unpredictable long LPWAN searches may consume too much battery-power to guarantee this.

Figure 2:
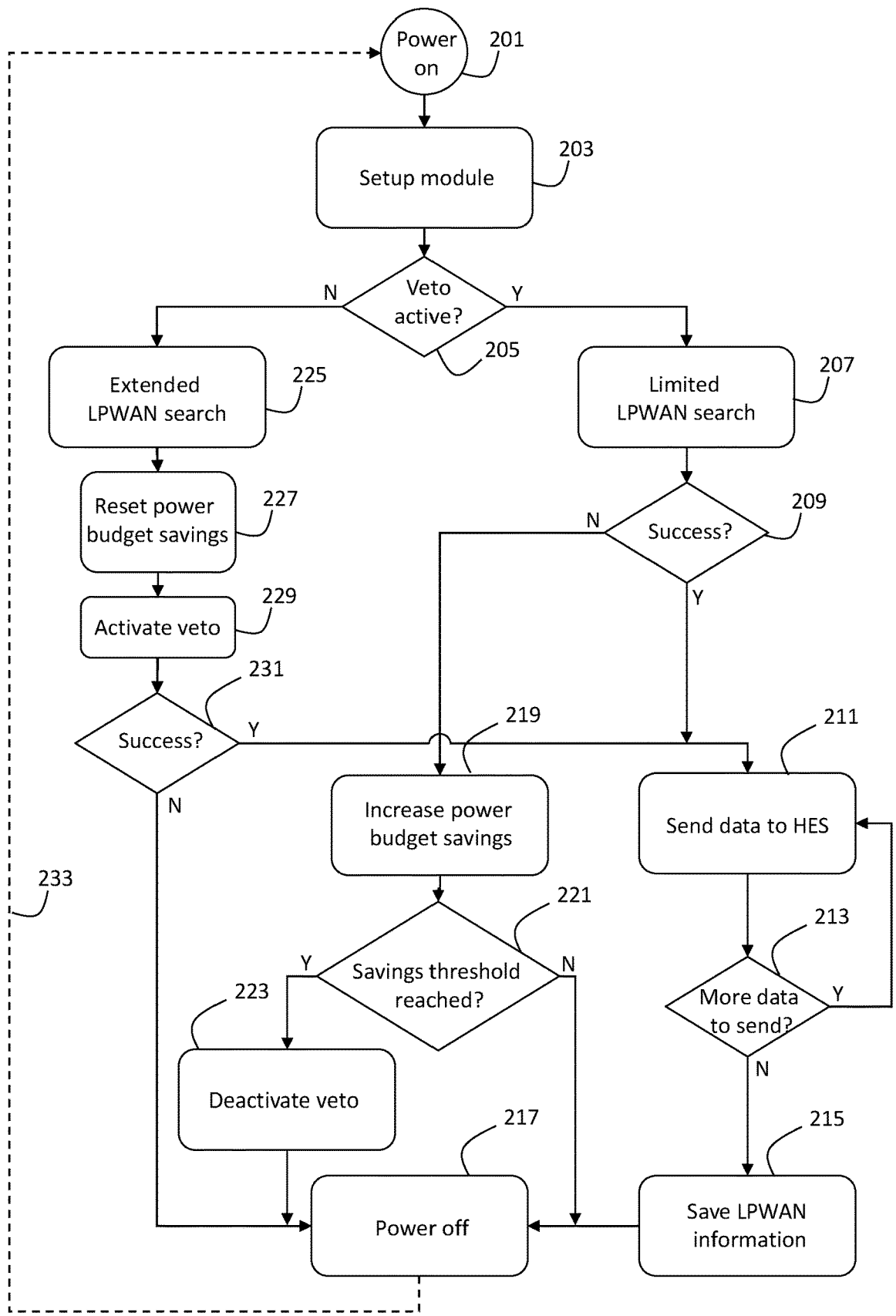
FIG. 2 is a schematic diagram of an example of a configuration of a measuring device disclosed herein.

As a solution to this problem, FIG. 2 shows a schematic diagram for an example of a configuration of the measuring device 7, wherein the configuration may be implemented by a software program installed and executed on a microcontroller of the measuring device 7. In a first step 201, the microcontroller of the measuring device 7 powers the LPWAN connection module up according to a predetermined data transmission schedule. For example, a reading of the measuring device 7 is supposed to take place every hour or once every day. So, when a reading is due, the LPWAN connection module is powered up 201. Alternatively, or in addition, the LPWAN connection module may be powered-up upon a user request, e.g. by pressing a button, switching a switch or sending a command by the mobile device 13 via near field communication 15 to the measuring device 7. Alternatively, or in addition, an event may trigger the LPWAN connection module to be powered-up, i.e. waked up, e.g. a detection of a leak, a burst, and/or a tampering with the measuring device 7. The LPWAN connection module is then set up in step 203, i.e. up-to-date stored or transmitted LPWAN connection information, e.g. EARFCN, if available, may be loaded to the LPWAN connection module. It then decided in step 205 whether a veto is active preventing an extended LPWAN search. The veto may be Boolean flag comprising the state "yes" Y and the state "no" N. The LPWAN connection module is configured to attempt to successfully establish a connection to the base station 5 by conducting either an extended LPWAN search or a limited LPWAN search. The limited LPWAN search may be essentially the same as an extended LPWAN search that is limited to a maximum search duration. Alternatively, the search strategy, e.g. prioritization and order of search for frequencies or frequency bands may differ between the extended LPWAN search or a limited LPWAN search. The veto may be active or non-active per initial default setting. So, after the very first powering-up of the LPWAN connection module, it may conduct an extended LPWAN search or a limited LPWAN search. If there is no stored or transmitted LPWAN connection information, e.g. EARFCN, initially available at the very first powering-up of the LPWAN connection module, it may be advantageous to conduct an extended LPWAN search. Otherwise, it may be advantageous to conduct a limited LPWAN search.

If the veto is active at step 205, a limited LPWAN search is conducted in step 207, e.g. an LPWAN search for a maximum of 45 seconds. The limited LPWAN search may use any available LPWAN connection information, e.g. EARFCN, to prioritize certain frequencies or frequency bands, i.e. search these before others, to successfully establish a LPWAN connection within the set time limit, e.g. 45 seconds. The limited LPWAN search 207 is either stopped in step 209 by successfully establishing the LPWAN connection to the base station 5 or by reaching the set time limit without successfully establishing the LPWAN connection to the base station 5. In case of a successful LPWAN connection to the base station 5, the LPWAN connection module sends data to the HES 3 via connected base station 5 in step 211. The data transmission window may be open for as long as the data transmission needs as shown in step 213. Alternatively, the data transmission window may be limited to make sure that a certain maximum energy quota per data transfer is not exceeded. Such a quota may be used to estimate a part of the power budget saved in each unsuccessful limited LPWAN search. The LPWAN connection information, e.g. EARFCN, of the successful LPWAN connection is then stored in step 2015 for subsequent readings. Then, in order to save battery power, the LPWAN connection module is powered-down in step 2017 until the next reading is due according to the data transmission schedule.

If the limited LPWAN search 207 was not successfully stopped in step 209, a total power budget savings is increased in step 217. This may be a increasing a counter value by one or adding an amount of power budget savings for this unsuccessful limited LPWAN search to a total accumulative amount of power budget savings for past unsuccessful limited LPWAN searches. In step 221, it is checked whether the total power budget savings has reached a savings threshold, e.g. 10 unsuccessful limited LPWAN searches or predetermined savings threshold in terms of an amount of battery-energy. If the savings threshold has not been reached, the LPWAN connection module is powered-down in step 2017 until the next reading is due according to the data transmission schedule. If the savings threshold has been reached, the veto is deactivated in step 223 before the LPWAN connection module is power-down in step 2017 until the next reading is due according to the data transmission schedule. It is important to understand that an unsuccessful limited LPWAN search means that a scheduled reading is "skipped", i.e. there is no retry or other LPWAN search triggered by a failed limited LPWAN search and no data sent. This actually "generates" the power budget savings that is increased in step 219.

If the veto was activated by the latest failed limited LPWAN search, because the total power budget savings has reached the savings threshold, the LPWAN connection module conducts an extended LPWAN search in step 225 when the next reading is due. Please note that further conditions (not shown in FIG. 2) in addition to the veto may be checked before an extended LPWAN search is conducted. For instance, a success rate of past limited LPWAN searches may need to be below a certain success rate threshold and/or a certain number of latest limited LPWAN searches must have been consecutively unsuccessful, or at least the latest limited LPWAN search must have been unsuccessful. If such further conditions are not met, a limited LPWAN search may be conducted per scheduled reading until they are met.

With each conducted extended LPWAN search 225 the total power budget savings is reduced in step 227, preferably reset to zero, or reduced by an amount equivalent to the power budget spent for the extended LPWAN search in excess of a typical or average limited LPWAN search. In addition, the veto is activated in step 229 in order to prevent that an extended LPWAN search 225 is conducted in subsequent readings before sufficient power budget savings have been accumulated. If the extended LPWAN search 225 was successful, data is sent to the HES 3 via the base station 5 in step 211, the LPWAN connection information, e.g. EARFCN, is stored in step 215, and the LPWAN connection module is powered-down in step 217. If the extended LPWAN search 225 failed, the LPWAN connection module is powered-down in step 217 right away. The time between powering-down in step 217 and powering-up in step 201 is determined by the data transmission schedule 233.

In the following, the LPWAN search procedure for the limited LPWAN search and extended LPWAN search is described by way of an example. In this example, a Quectel BC66NA NB-IoT modem is used as the LPWAN connection module. The module searches for a registered public land mobile network (RPLMN) first. If the module was registered in a network before, this is set as the public land mobile network (PLMN) to use. If no RPLMN exist, then an "Equivalent Home PLMN" (EHPLMN) is selected as PLMN if available. If no EHPLMN is available, then a "Home PLMN" (HPLMN) is selected as PLMN. The module will search in the selected PLMN for a suitable cell to camp on.

Both the limited LPWAN search and extended LPWAN search include a scanning process during which different frequencies or frequency bands are scanned. By way of example, the scanning process may start with high priority frequencies based on stored or received LPWAN connection information. If that is not successful and/or no LPWAN connection information is available, high priority frequency bands may be scanned. Each band may be scanned stepwise. At first, a band may be scanned with a high threshold, i.e. being sensitive only to a LPWAN with a high signal strength. Then, the threshold may be lowered in one or more steps to find a LPWAN with a lower signal strength. If more than one band is enabled, all bands may be scanned with high threshold and if no LPWAN was found matching the selected PLMN, then all bands may be scanned with low threshold.

If no priority is defined for the band, then the bands may be scanned in ascending order of the band number. E.g. if bands 3, 8, and 20 are active, the order of scanning may be as follows:

1. Search band 3, then 8 and then 20 with low threshold.
2. Search band 3, then 8 and then 20 with high threshold.

If a priority is given to some band(s), the prioritized band(s) may be scanned with low threshold before scanning any non-prioritized bands with high threshold. For example, if there are four bands enabled (e.g. band 1, 3, 8, 20) and two of them are prioritized in order (e.g. first band 20 and then 8), the search order may be as follow:
1. Search band 20 and then 8 (high threshold)
2. Search band 20 and then 8 (low threshold)
3. Search band 1 and then 3 (high threshold)
4. Search band 1 and then 3 (low threshold)

If only one band is scanned at a time, following an ascending scan order may take relatively long time, e.g. in case band 20 is the band to be found. This is, because search bands 3 and 8 may be scanned twice before the search in band 20 starts. To reduce this effect, the enabled bands may be limited to the bands licensed in the country and/or region and preset in order according to band(s) used by the MNO in the country and/or region. The measuring devices may be shipped with accordingly preset enabled frequency bands.

LPWAN connection information may include an EARFCN list that lists frequencies to be prioritized, i.e. scanned first, e.g. a list of EARFCN previously successfully used by the modem. The list may have a certain length, e.g. comprising 10 slots, and the oldest entry may be overwritten if there are no more free slots.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 meter reading system
3 HES
5 base station
7 measuring device
9 LPWAN connection using NB-IoT
11 internet connection
13 mobile device
15 near field communication or WLAN
17 wireless connection
201 powering-on LPWAN connection module
203 setting up LPWAN connection module
205 checking veto
207 conducting limited LPWAN search
209 checking success
211 sending data to HES
213 checking if more data is to send
215 storing LPWAN connection information
217 powering-off LPWAN connection module
219 increasing power budget savings
221 checking if savings threshold is reached
223 deactivating veto
225 conducting extended LPWAN search
227 resetting power budget savings
229 activating veto
231 checking success
233 data transmission schedule

What is claimed is:

1. A battery-powered stationary measuring device for measuring or detecting a value at a utility installation, the measuring device comprising an LPWAN connection module configured to establish a wireless communication connection to a Low Power Wide Area Network (LPWAN) for communicating data to a head-end-system (HES) via the LPWAN, wherein the LPWAN connection module is configured to:
   attempt to successfully establish a connection to the LPWAN by selectively conducting one of a group comprising: an extended LPWAN search and a limited LPWAN search;
   veto the extended LPWAN search as long as a savings threshold for a total number or amount of power budget savings has not been reached;
   increase the total number or amount of power budget savings for each unsuccessful limited LPWAN search; and
   allow the extended LPWAN search when a total number or amount of power budget savings has reached the savings threshold, wherein the total number or total amount of power budget savings is reduced with each conducted extended LPWAN search.

2. The measuring device according to claim 1, wherein the total number of power budget savings is a counter value for counting the number of unsuccessful limited LPWAN searches, wherein the savings threshold is a predetermined integer value.

3. The measuring device according to claim 1, wherein the total amount of power budget savings is an accumulated value for a sum of power budget savings by unsuccessful limited LPWAN searches, wherein the savings threshold is a predetermined threshold value.

4. The measuring device according to claim 1, wherein the LPWAN connection module is configured to limit the limited LPWAN search to a predetermined maximum search duration and/or prioritized frequencies or frequency bands.

5. The measuring device according to claim 1, wherein the LPWAN connection module is configured to use LPWAN connection information stored in or transmitted to the measuring device for the limited LPWAN search.

6. The measuring device according to claim 1, wherein the measuring device is configured to power-up the LPWAN connection module according to a predetermined data transmission schedule.

7. The measuring device according to claim 1, wherein the measuring device is configured to power-down the LPWAN connection module after each unsuccessful limited LPWAN search.

8. The measuring device according to claim 1, wherein the LPWAN connection module is configured to conduct a limited LPWAN search when an extended LPWAN search is vetoed.

9. The measuring device according to claim 1, wherein the extended LPWAN search comprises scanning for longer duration and/or more frequencies or frequency bands than the limited LPWAN search.

10. The measuring device according to claim 1, wherein the measuring device is a consumption meter for registering a consumption of water, gas and/or thermal energy at the utility installation.

11. The measuring device according to claim 1, wherein the LPWAN connection module is configured to send data to the head-end-system via the LPWAN after each successfully established LPWAN connection.

12. The measuring device according to claim 1, wherein the LPWAN connection module is configured to conduct an allowed extended LPWAN search when the latest limited LPWAN search was unsuccessful.

13. The measuring device according to claim 1, wherein the LPWAN connection module is configured to conduct an allowed extended LPWAN search when a success rate of limited LPWAN searches is below a predetermined success rate threshold.

14. The measuring device according to claim 1, wherein the LPWAN connection module is configured to conduct an allowed extended LPWAN search when a predetermined number of latest limited LPWAN searches was consecutively unsuccessful.

15. The measuring device according to claim 1, wherein the LPWAN is a network using a Narrowband Internet of Things (NB-IoT) or Long-term Evolution Machine Type Communication (LTE-M) technology standard.

* * * * *